US008745918B2

(12) United States Patent  (10) Patent No.: US 8,745,918 B2
Dyson-Coope et al.  (45) Date of Patent: Jun. 10, 2014

(54) GARDEN BEDDING SYSTEM

(76) Inventors: Chris Dyson-Coope, Weston, MO (US);
Warren Moore, Lenexa, KS (US);
David Brandon Westlund, Portland, OR (US)

( * ) Notice: Subject to any disclaimer, the term of this patent is extended or adjusted under 35 U.S.C. 154(b) by 14 days.

(21) Appl. No.: 13/134,519

(22) Filed: Jun. 9, 2011

(65) Prior Publication Data

US 2012/0055085 A1  Mar. 8, 2012

Related U.S. Application Data

(60) Provisional application No. 61/380,553, filed on Sep. 7, 2010.

(51) Int. Cl.
*A01G 9/00* (2006.01)
(52) U.S. Cl.
USPC .......................................... 47/1.01 R; 33/566
(58) Field of Classification Search
USPC ....... 47/1.5, 1.7, 1.01 R, 20.1, 33, 56; 33/1 F, 33/1 G, 760, 562, 563, 566
See application file for complete search history.

(56) References Cited

U.S. PATENT DOCUMENTS

| | | | | |
|---|---|---|---|---|
| 1,973,900 A | * | 9/1934 | Hylander | 434/305 |
| 3,704,544 A | * | 12/1972 | Spanel et al. | 47/9 |
| 3,760,766 A | * | 9/1973 | Wopschall | 116/240 |
| D283,973 S | * | 5/1986 | Hougaard | D8/1 |
| 5,246,253 A | * | 9/1993 | Mykrantz | 283/117 |
| 5,274,951 A | * | 1/1994 | Besing | 47/56 |
| 5,282,317 A | * | 2/1994 | Carter et al. | 33/1 B |
| 6,763,601 B1 | * | 7/2004 | Turley | 33/566 |
| 6,845,565 B2 | * | 1/2005 | Hajla | 33/436 |
| RE39,379 E | * | 11/2006 | Wechsler | 428/99 |
| 7,464,480 B2 | * | 12/2008 | Vetromila | 33/436 |
| 8,087,179 B1 | * | 1/2012 | Gomez | 33/563 |
| 2003/0009938 A1 | * | 1/2003 | Brenner | 47/58.1 SC |
| 2003/0061722 A1 | * | 4/2003 | Bradley | 33/563 |
| 2008/0209804 A1 | * | 9/2008 | Stradiot | 47/64 |

* cited by examiner

*Primary Examiner* — Rob Swiaktek
*Assistant Examiner* — Ebony Evans
(74) *Attorney, Agent, or Firm* — Mashburn Law Office, LLC; Donna Denise Mashburn

(57) ABSTRACT

A garden planting aid including a biodegradable ground cover having a plurality of grid spaces formed by spaced horizontal and vertical lines. A first measure tape having a plurality of first indicia;

a second measure tape having a plurality of second indicia.

The first indicia are associated with columns of grid spaces and the second indicia are associated with rows of grid spaces such that each grid space has a unique designation that includes a first and second indicia. The aid includes a plan designating garden objects that can be placed at the unique designation.

1 Claim, 5 Drawing Sheets

Figure 2

| SPACE | PLANT | INSTRUCTIONS |
|---|---|---|
| A1 | 1 SUNBURST | Cover roots 2" deep |
| A2 | BEANS | USE SEED GRID |
| A3 | ONION SETS | USE DIBBER TO CREATE HOLES |
| B1 | STATUE | |
| | | |
| | | |

GARDEN BEDDING SYSTEM

CROSS REFERENCES TO RELATED APPLICATIONS

Applicant claims priority under 35 USC 119 e to provisional application 61/380,553 filed Sep. 7, 2010.

STATEMENT AS TO RIGHTS TO INVENTIONS MADE UNDER FEDERALLY SPONSORED RESEARCH AND DEVELOPMENT

Not Applicable.

BACKGROUND OF THE INVENTION

1. Field of the Invention

The present invention relates in general to a planting (bedding) system and more specifically to a planting (bedding) system where the components are uniquely attached together.

2. Brief Description of Prior Art

It is known in the prior art to provide garden plans designed to help gardeners plan an effective garden. A typical plan might show a rough layout of how plants can be planted. The problem has been that it is left up to the gardener to measure for the placement of various plants and garden objects.

There is a need for a simpler universal arrangement that help the gardener layout an effective garden.

SUMMARY OF THE INVENTION

A garden planting aid including a biodegradable ground cover having a plurality of grid spaces formed by spaced horizontal and vertical lines. A first measure tape having a plurality of first indicia such as letters and a second measure tape having a plurality of second indicia such as numbers.

The first indicia are associated with columns of grid spaces and the second indicia are associated with rows of grid spaces such that each grid space has a unique designation that includes a first and second indicia and wherein said aid includes a plan designating garden objects that can be placed at said unique designation.

DESCRIPTION OF THE PREFERRED EMBODIMENT

Figure 1:
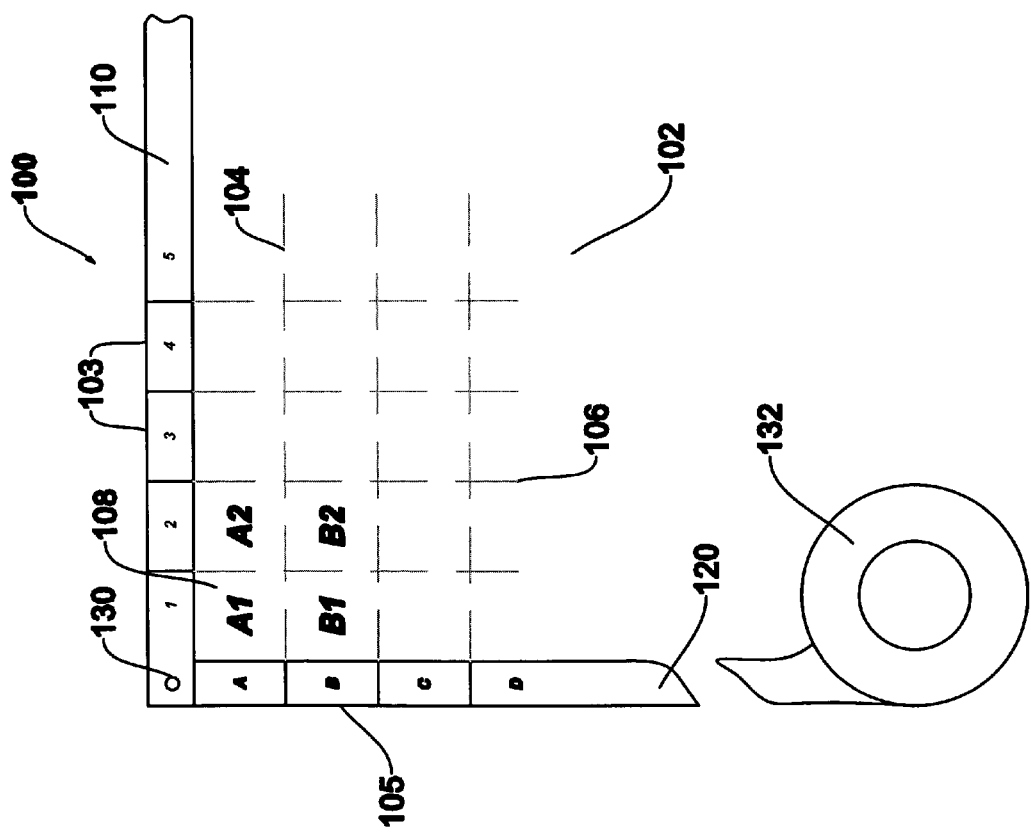
FIG. 1 is a view of the present invention in use,
FIG. 2 a view of a portion of the device.

The apparatus of the present invention shows, in FIG. 1, a grid planting arrangement 100 that includes a printed ground cover 102. The printed ground cover 102 includes a grid created by a plurality of colored horizontal lines 104 and vertical lines 106. The printed ground cover 102 is made from a material that can be used as a ground cover and that can be covered with mulch. The cover 102 can either stay in place to prevent the emergence of weeds or it can be made of a material such as a biodegradable mulch fabric that will break down over time. The grid planting arrangement 100 includes two edge tapes 110 and 120. A first waterproof flexible tape 110 includes a plurality of numbered space measures 103 that have a length corresponding to the spacing of the lines 106. A second flexible tape 120 has lettered space measures 105 that correspond to the spacing of lines 104. The result creates a plurality of spaces such as squares 108 that have a corresponding numbered and lettered designation such as A1, A2, B1, B2 and so forth. The tapes 110, 120 and the printed ground cover 102 are pegged 130 at one corner and could be pegged to the ground at additional locations. The tapes 110, 120 can come in a roll 132.

FIG. 2 shows a plan 200 that designates one garden design that can be planted using the grid planting arrangement 100. The plan 200 can include indicia indicating a space column 202, a plant column 204, and an instruction column 206. The row 208 shows that in space A1 a sunburst plant can be planted. The row 208 gives additional instructions to successfully plant the sunburst plant. The plan 200 is an example. Many planting plans can be provided that would use the grid planting arrangement 100. For example celebrity plans could be provided over the Internet or at retail shops such as green houses. A kit can be assembled that would include one or more grid planting arrangement 100, a plan 200 and the plants (column 204) that would be planted. This provides the gardener in one place, all the things they need to plant a successful garden.

Figure 3:
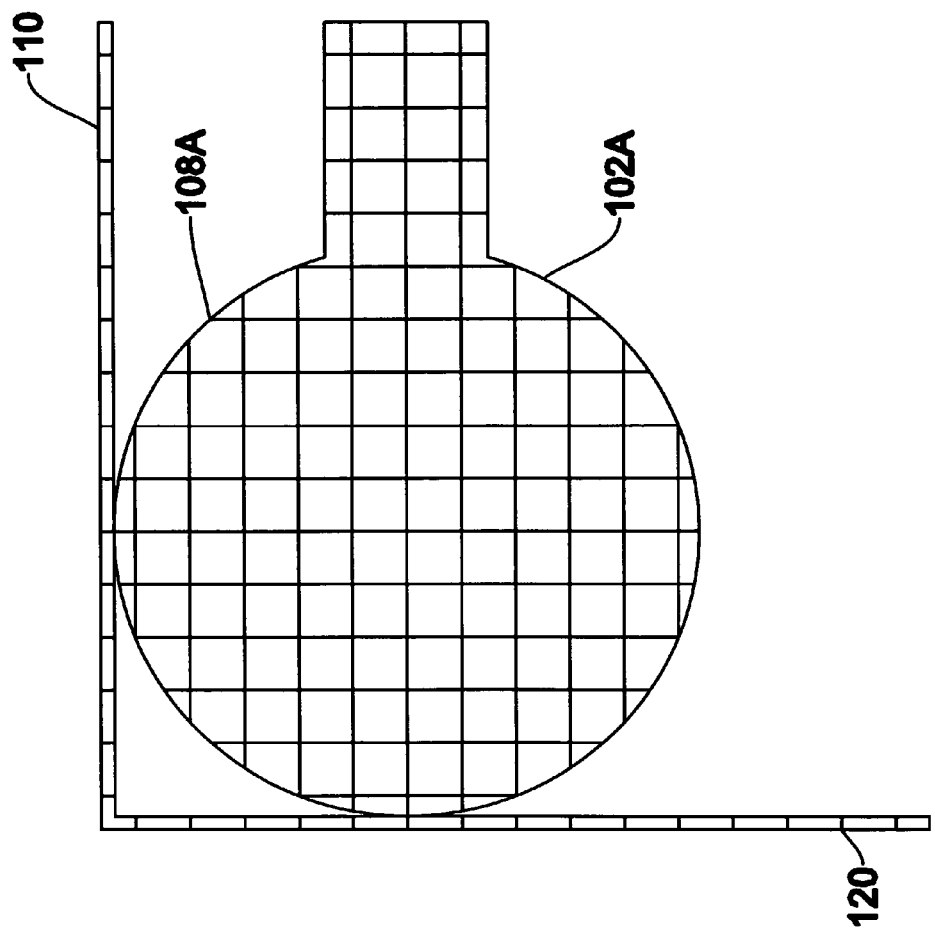
FIG. 3 shows detail of the invention in another application.

FIG. 3 shows the arrangement 100 applied to a custom irregular shaped garden. In this case the printed ground cover 102 is shaped to match the garden, this can be done as part of a custom kit or the gardener could print a plan 200 from the Internet and cut the printed ground cover 102. The result is a custom shape cover 102A. In this arrangement the same tapes 110 and 120 are laid out so that the existing grids on the custom shape cover 102A will still have an alpha-numeric designation. Partial square spaces such as 108A can have an alpha-numeric designation and can still be used.

Figure 4:
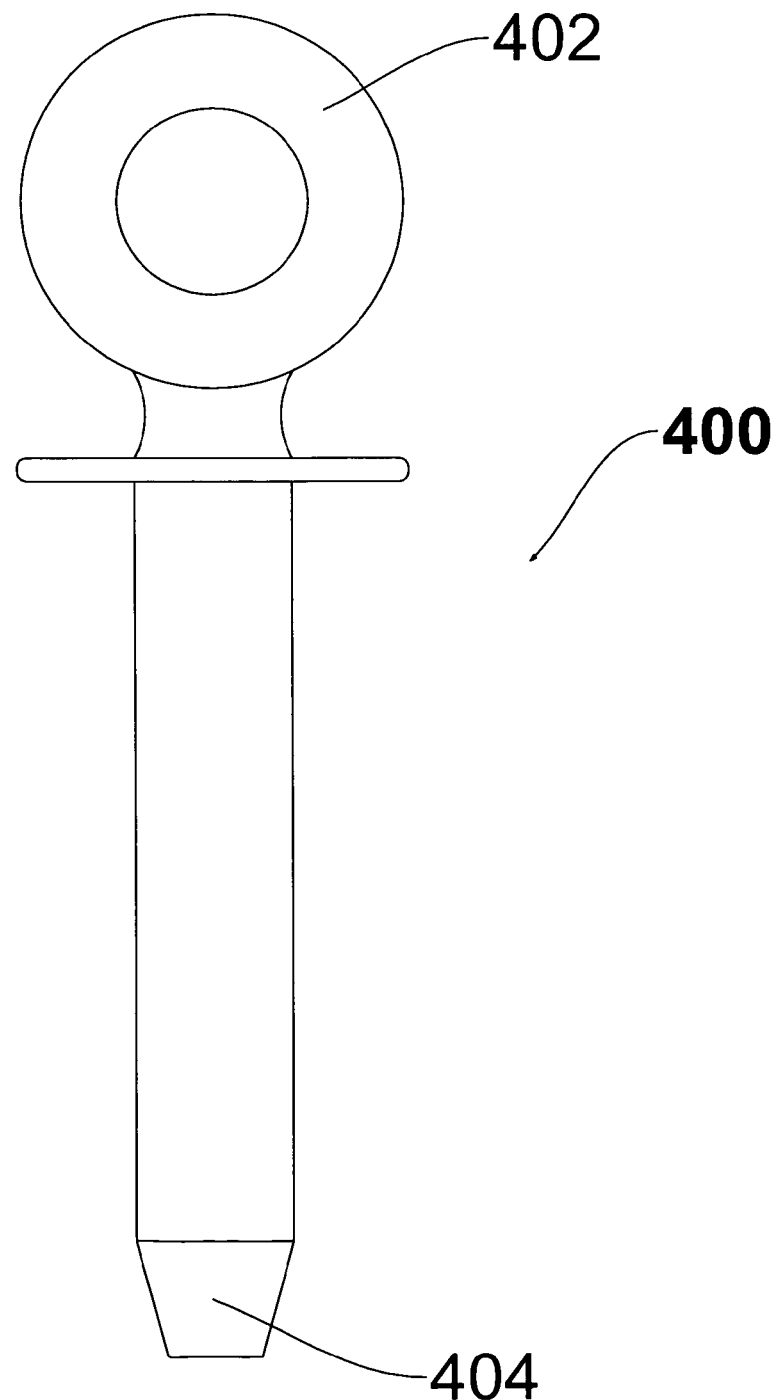
FIG. 4 shows details and
FIG. 5 shows details.

FIG. 4 shows a tool 400 usable with the arrangement. The tool 400 includes a loop top 402 and pointed base 404. The tool 400 can be used to pin the flexible rules 110, 120 to the ground and the tool 400 can also be used to poke holes through the printed ground cover 102 and can be used as a dibber to place holes in the ground for seeds or small bulbs.

Figure 5:
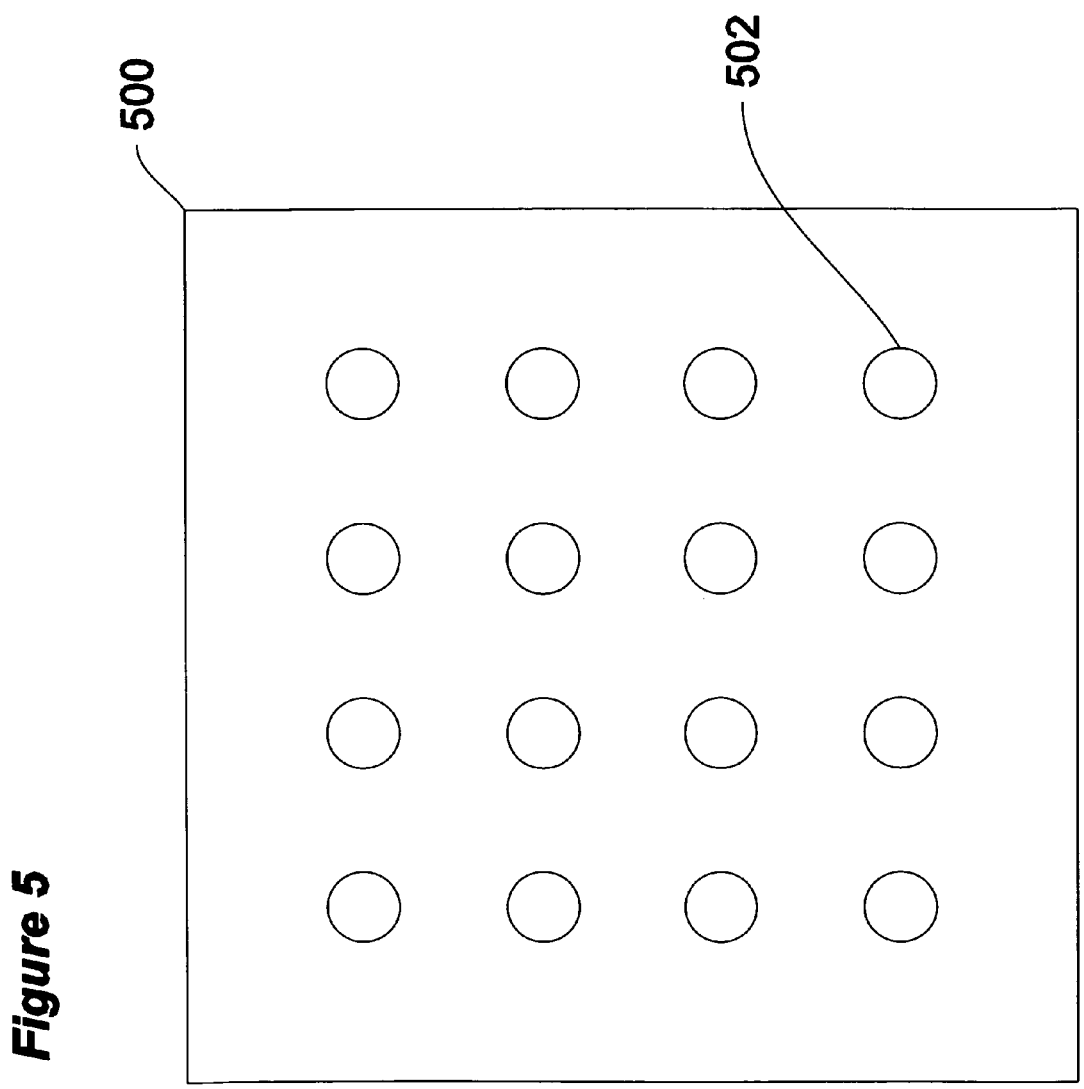

FIG. 5 shows a template tool 500. The template 500 fits within a single grid space like A1 or B2 for example. The template 500 has holes 502 that can be laid out in a variety of patterns such as the one shown and can be used to plant seeds or small bulbs within a single space. Tool 400 can place holes through the template 500. With this template tool 500 a given planting plan 200 can include very small plants in the same plan with larger ones. Several template tools 500 with different patterns can be provided for seeds and bulbs for example.

In use, a garden plan 200 can be offered through the Internet, through a retail location or as part of a kit for example. The plan 200 includes a list 204 of garden objects such as plants, bulbs, seeds and statuary for example and a corresponding grid location (A1, B2 . . . ) for that garden object. Once a gardener has a plan 200 the next step is to prepare the site so it is free of weeds and debris and then the printed ground cover 102 is laid out on the ground and pegged in place. The printed ground covers 102 can be any size or shape 102A and multiple covers 102 can be used if required. The corners of the printed ground cover 102 can be staked to the ground using tools 400. The tapes 110, 120 are placed adjacent the printed ground cover 102 such that indicia on the tapes align with columns 103 and rows 105 of grid spaces 108 on the cover 102. Typically the tape 110 will be perpendicular to the tape 120 creating a coordinate system. The printed ground cover 102 can be cut or folded to any shape to match a plan 200. Once the printed ground cover 102 and tapes 110, 120 are in place plants, seeds, bulbs and other objects 204 can be placed according to the grid locations (A1, B2 etc) and instructions 206 given by the plan 200. A seed or bulb might be planted by poking a hole in the cover 102 with a tool 400. A larger plant might require a gardener to cut out a grid location space. Once planted, the gardener can water and place mulch over the printed ground cover 102.

It would be obvious to those skilled in the art that modifications may be made to the embodiments described above without departing from the scope of the present invention. Thus the scope of the invention should be determined by the appended claims in the formal application and their legal equivalents, rather than by the examples given.

We claim:

1. A garden planting aid comprising:
a biodegradable ground cover having a plurality of grid spaces formed by spaced horizontal and vertical lines;
a first separable measure tape affixed to a first edge of the ground cover having a plurality of first indicia;
a second separable measure tape affixed to a second edge of the ground cover having a plurality of second indicia, wherein the first indicia are associated with columns of said plurality of grid spaces and the second indicia are associated with rows of said plurality of grid spaces such that each said plurality of grid spaces has a unique designation that includes a first and second indicia; and a plan designating garden objects that can be placed at said unique designation.

\* \* \* \* \*